United States Patent [19]

Ljunggren

[11] Patent Number: 5,073,701
[45] Date of Patent: Dec. 17, 1991

[54] ARRANGEMENT IN A RANGE OR A COOKING HOB

[75] Inventor: Per H. Ljunggren, Bromma, Sweden

[73] Assignee: Aktiebolaget Electrolux, Stockholm, Sweden

[21] Appl. No.: 475,160

[22] Filed: Feb. 5, 1990

[30] Foreign Application Priority Data

Feb. 14, 1989 [SE] Sweden .................... 89005029

[51] Int. Cl.⁵ .................................... H05B 1/02
[52] U.S. Cl. ............................ 219/448; 219/497; 219/492; 219/493; 340/588
[58] Field of Search .......... 219/448, 449, 451, 452, 219/492, 493, 494, 497, 501, 505, 506; 307/117; 340/588, 589, 365 R

[56] References Cited

U.S. PATENT DOCUMENTS

| | | | |
|---|---|---|---|
| 4,302,662 | 11/1981 | Kicherer et al. | 219/493 |
| 4,367,387 | 1/1983 | Tachihara et al. | 219/493 |
| 4,593,180 | 6/1986 | Narita et al. | 219/492 |
| 4,755,646 | 7/1988 | Fowler | 219/492 |
| 4,918,293 | 4/1990 | McGeorge | 219/492 |

*Primary Examiner*—Mark H. Paschall
*Attorney, Agent, or Firm*—Pearne, Gordon, McCoy & Granger

[57] ABSTRACT

An arrangement in a range, a cooking hob or the like having at least one electrically heated hot plate (11) and/or oven, comprising a manually operable setting system (13) for the setting of a desired power or temperature for the hot plate or the oven. A detecting system (15) is arranged to detect changes in the setting of the setting system. A timing system (16) co-operates with the detecting system (15) to be activated by the latter. A switching system (17,26) co-operates with the timing system (16) to disconnect the power to the hot plate (11) or the oven on the reaching of an end time determined by the timing system, said timing system being reset each time the detecting system (15) is activated and then operated to start counting towards the predetermined end time.

4 Claims, 2 Drawing Sheets

ARRANGEMENT IN A RANGE OR A COOKING HOB

BACKGROUND OF THE INVENTION

The present invention relates to electric ranges or cooking hobs in general and, more particularly, to a device which automatically disconnects the power to the range or cooking hob after a predetermined time of unattended operation.

In ranges and cooking hobs most often hot plates are being controlled such that the desired power level is set by a setting knob and then the power set is operating until the hot plate is switched off. In certain ranges and cooking hobs thermostat-controlled hot plates are provided and in these it will be achieved that the hot plate cannot assume a dangerously high temperature. However, in most cases the range is equipped with at least one high power hot plate, a so-called quick hot plate, and if forgotten when set at the highest power level the hot plate can assume very high temperatures which, under certain circumstances, may cause a fire or result in other damages.

SUMMARY OF THE INVENTION

It is an object of the invention to prevent hot plates, in particular, from assuming unallowably high temperatures as a result of the plate being in operation unattended for a long time. This object is achieved in a range or a cooking hob having characteristic features which include timing means which cooperate with detecting means such that the power to the cooking hob or hot plate is disconnected at the end of the time determined by the timing means.

BRIEF DESCRIPTION OF THE DRAWINGS

The invention will now be described in detail in connection with two embodiments with reference to the enclosed drawings, in which.

DETAILED DESCRIPTION OF THE PREFERRED EMBODIMENT

Figure 1:
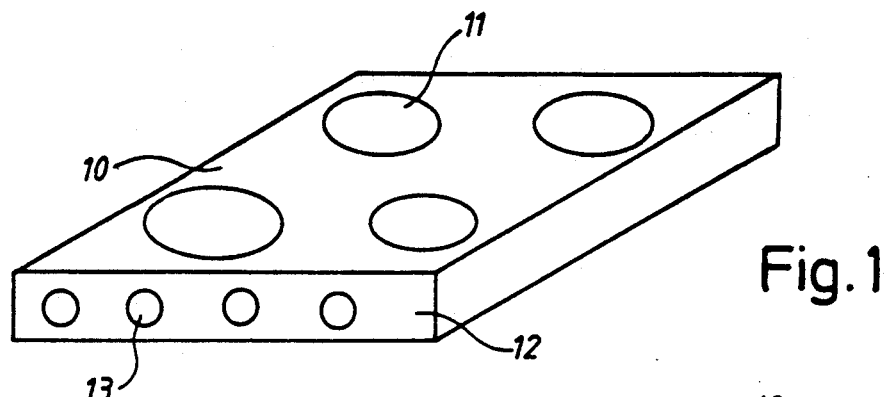
FIG. 1 schematically shows a cooking hob having four hot plates.

In FIG. 1 a cooking hob 10 is shown having four hot plates 11 and a panel 12 at the front edge of the hob on which setting knobs 13 are disposed for the setting of the desired power level or temperature for each respective hot plate.

Figure 2:
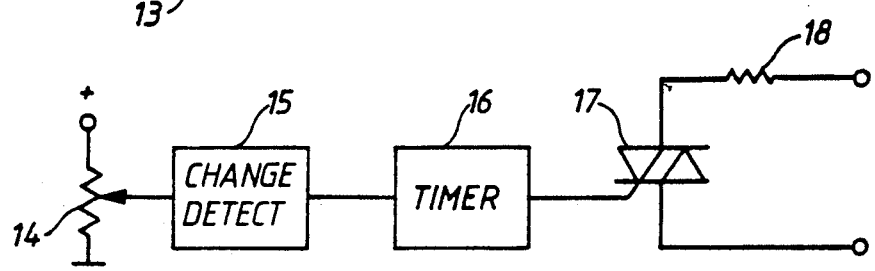
FIG. 2 is a schematic diagram of a circuit for the time-controlled disconnection of a hot plate.

In FIG. 2 a circuit diagram is shown for a device for the control of a hot plate. In this example the setting knob acts on a potentiometer 14, the movable terminal of which is connected to a detector 15 detecting changes in the setting of the setting knob. The position set is represented by a voltage, the magnitude of which depends on the position of the movable terminal. The detector can be of any known type that detects voltage changes. The detector is connected to a time counting arrangement or timer 16 having an output connected to the control electrode of a triac 17 by which the hot plate, here represented by a resistor 18, can be connected or disconnected from an AC mains.

As pointed out by way of introduction, the object of the invention is to provide an arrangement by means of which it will be possible to disconnect the hot plate in case it has been connected for a considerable time unattended. In accordance with the invention, this fact is detected by checking that the setting knob of the hot plate is operated within a predetermined time period as counted from the very first connection of the hot plate. At the connection of the hot plate the detector 15 is activated to emit a signal to the timer 16 operating to reset said timer. Thereafter, the timer counts up towards an end time corresponding to the expiration of the predetermined time period.

Now, if the setting knob is again operated before the end time has been reached, the detector is once again activated to reset the timer. However, should no operation of the setting knob take place before the end time has been reached, a signal will be emitted at the output of the timer which will cause the triac 17 to disconnect the resistor 18.

Figure 3:
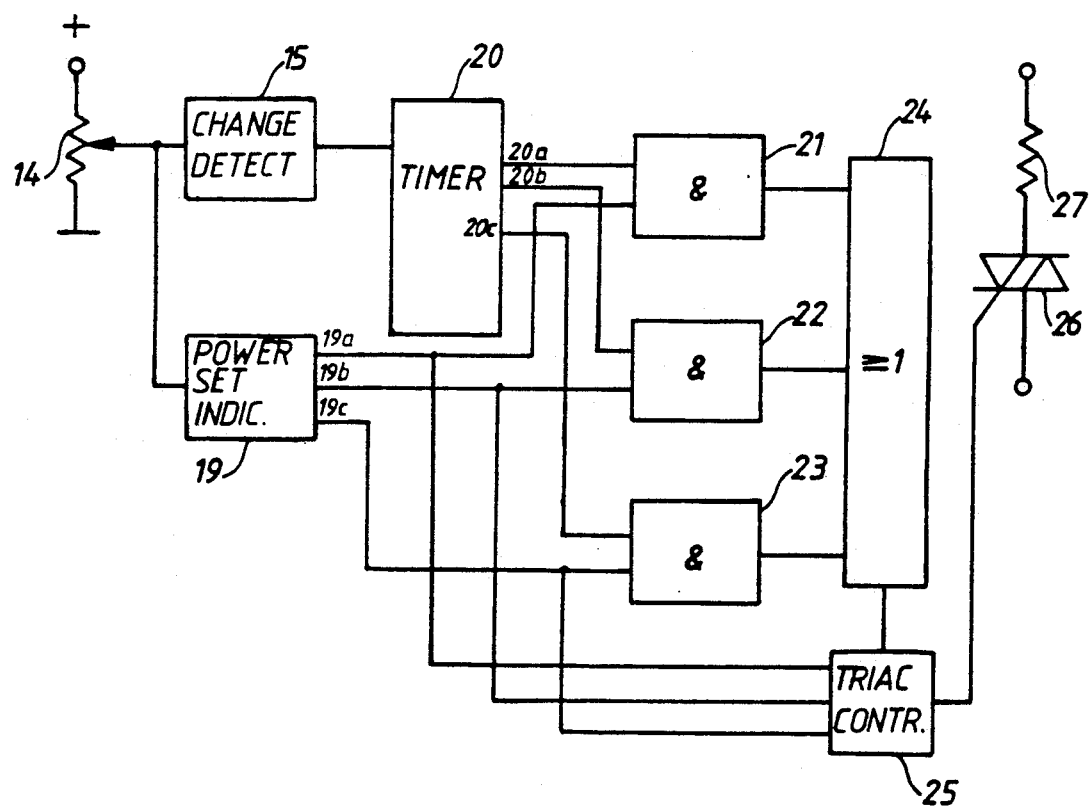
FIG. 3 is an embodiment according to FIG. 2 which has been modified to the effect that the time at which the hot plate is disconnected be varied with respect to the power level or temperature set.

Sometimes, in order to further increase the safety level in case the hot plate has been set for high power, it may be suitable to let the end time depend on the power or temperature setting such that a higher power setting corresponds to a shorter end time. FIG. 3 shows an embodiment in which the end time can be varied in this way. As in FIG. 2, the setting knob operates a potentiometer, the output voltage of which is a measure of the power or temperature setting. This is detected in a block 19 having a number of outputs 19a, b, c representing the respective power or temperature setting.

As in FIG. 2, changes in the output voltage of the potentiometer 14 are detected in a block 15, which represents a detector of changes in the setting of the setting knob. The block 15 is connected to a timer 20 having outputs 20a, b, c, the three different end times which correspond to the three settings of the potentiometer 14 represented by the outputs 19a, b, c. The outputs from the blocks 19 and 20, respectively, are arranged in pairs and connected to three AND-gates 21, 22, 23 such that the outputs 19a, 20a are connected to the AND-gate 21, the outputs 19b, 20b are connected to the AND-gate 22 and the outputs 19c, 20c are connected to the AND-gate 23. The outputs from the AND-gates 21, 22, 23 are put together in an OR-gate 24 having an output connected to a block 25 which constitutes a control device for a triac 26 provided for the connection and disconnection, respectively, of a resistor 27 which represents the hot plate.

The circuit diagram of FIG. 3 is a simple one, the purpose of which is to show a solution of the problem related to different end times. When the potentiometer 14 has taken its lowest position, a mechanical switch (not shown) assures that the resistor 26 is disconnected. Then, when the potentiometer is operated to a first setting, in a way not shown in detail, supply voltage from the mains is applied and the block 19 indicates on one of its outputs, say output 19a, the power or temperature set. In this way the control device 25 is operated to activate the triac 26 to control, in an on/off control mode, the heating of the resistor 27 in accordance with the setting made. At the same time the detector 15 is activated to emit a signal which resets the timer 20. The timer starts counting up and, at the actual end time, an output signal is expected on the output 20a. When the time has expired the AND-gate 21 and, hence, the OR-gate 24 is activated which in turn operates the control device to inactivate the triac 26 and disconnect the resistor 27. For other power settings the outputs 19b or 19c of block 19 are activated and, for the corresponding end times, the AND-gates 22 or 23 are activated in an analogous manner. The circuit arrangement may be provided with an automatic reset to the power setting made but a manual reset is preferred.

Figure 4:
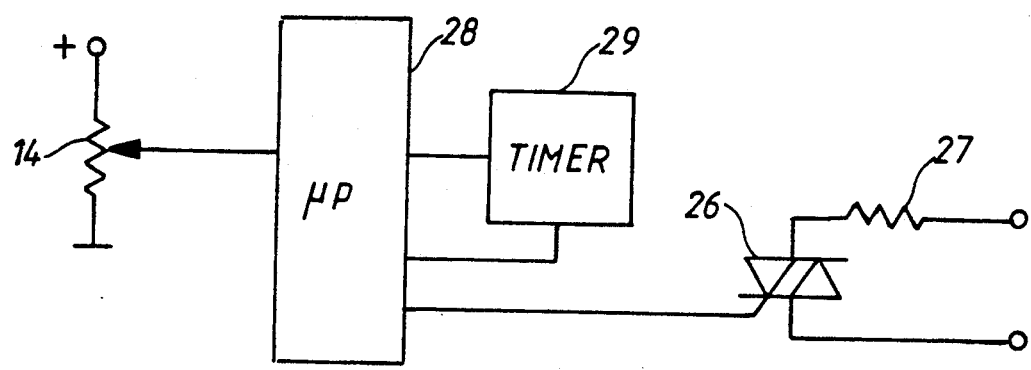
FIG. 4, finally, is a schematic diagram of a microprocessor-based circuit.

FIG. 4 shows an embodiment wherein a microprocessor 28 has been used for the control of the triac 26. As before, the potentiometer 14 generates a voltage which represents the power or temperature setting. This voltage as well as the changes in it are directly detected by the microprocessor 28 which co-operates with a timer 29 in the same way as described above. Upon changes in the potentiometer voltage being detected, resetting of the timer 29 takes place and the timer starts counting up from its reset position. In case a predetermined end time is reached, which is determined by the microprocessor with respect to the power setting chosen, the microprocessor emits a signal which deactivates the triac 26, causing the resistor 27 to be disconnected without the setting knob and, accordingly, the potentiometer being operated. Also, in this case, a manually operable resetting means can be provided.

I claim:

1. An arrangement in a range or a cooking hob having at least one electrically heated hot plate (11), said arrangement comprising a manually operable setting means (13) for the setting of a desired power or temperature for the hot plate, characterized by a detecting means (15) for detecting changes in the setting of the setting means, timing means (16) which cooperate with the detecting means (15) to be activated by the latter, and a switching means (17,26) which cooperates with the timing means (16,20) to disconnect the power to the hot plate (11) on reaching an end time determined by the timing means, said timing means being reset each time the detecting means (15) is activated to start counting-up towards the predetermined end time.

2. Arrangement according to claim 1, characterized in that the end time depends on the power or temperature setting so that a higher power or te perature results in a shorter end time.

3. Arrangement according to claim 2, characterized in that the timing means (16,20) is arranged to count up from its reset position towards the longest end time to occur, said timing means further having a number of outputs (20a,b,c) corresponding to the number of end times, a setting detection means (19) being arranged to detect the power or temperature setting, said means having a number of outputs (19a,b,c) corresponding to the number of power or temperature settings, each output (20a,b,c) of the timing means (20) being connected to an input of an AND-gate (21,22,23), the second input of which being connected to the corresponding output (19a,b,c) of said setting detection means (19), said outputs of the AND-gates (21,22,23) being connected to an OR-gate (24), the output of which being connected to the switching means (17,26) for the connection and disconnection, respectively, of the hot plate (11).

4. Arrangement according to claim 2, characterized in that a microprocessor (28) is provided to co-operate with the setting means (13) to connect or disconnect the hot plate (11) via an electronic switch (26), said setting means (13) being arranged to emit to the microprocessor (28) a voltage the magnitude of which represents the power or temperature setting, the microprocessor being programmed to detect every change in the setting of the setting means and to reset the timing means (29) at the same time as it orders the timing means to start counting towards an end time determined by the microprocessor with respect to the magnitude of the voltage from the setting means (13), said microprocessor (28) operating the electronic switch (26) to disconnect the hot plate (11) in case the setting means is not again operated before the end time has been reached.

* * * * *